(12) United States Patent
Watson (10) Patent No.: US 8,483,883 B1
(45) Date of Patent: Jul. 9, 2013

(54) SYSTEM AND METHOD FOR CONTROLLING SUPPLY FAN SPEED WITHIN A VARIABLE AIR VOLUME SYSTEM

(76) Inventor: David Stanley Watson, San Anselmo, CA (US)

( * ) Notice: Subject to any disclaimer, the term of this patent is extended or adjusted under 35 U.S.C. 154(b) by 353 days.

(21) Appl. No.: 12/802,969

(22) Filed: Jun. 16, 2010

Related U.S. Application Data (60) Provisional application No. 61/268,872, filed on Jun. 16, 2009.

(51) Int. Cl.
G05D 23/00 (2006.01)
B60S 1/54 (2006.01)
B60H 1/00 (2006.01)
F24F 11/00 (2006.01)
F24F 7/00 (2006.01)
G05D 23/12 (2006.01)

(52) U.S. Cl.
USPC ......... 700/278; 236/49.3; 236/92 R; 454/123; 454/145; 454/238

(58) Field of Classification Search
USPC ......... 700/276; 454/123, 145, 238; 236/92 R, 236/49.3
See application file for complete search history.

(56) References Cited

U.S. PATENT DOCUMENTS

| 4,044,947 A | | 8/1977 | Spethmann | |
|---|---|---|---|---|
| 4,077,567 A | * | 3/1978 | Ginn et al. | 236/49.4 |
| 4,086,781 A | * | 5/1978 | Brody et al. | 62/180 |
| 4,186,655 A | | 2/1980 | Mallory et al. | |
| 4,231,515 A | | 11/1980 | Ring | |
| 4,284,943 A | | 8/1981 | Rowe | |
| 4,392,417 A | | 7/1983 | Johannsen | |
| 4,407,185 A | | 10/1983 | Haines et al. | |
| 4,437,608 A | * | 3/1984 | Smith | 236/13 |
| 4,487,363 A | * | 12/1984 | Parker et al. | 236/49.3 |
| 4,549,601 A | * | 10/1985 | Wellman et al. | 165/205 |
| 4,630,670 A | | 12/1986 | Wellman et al. | |
| 4,637,546 A | * | 1/1987 | DeMeyer | 236/49.4 |
| 4,750,544 A | * | 6/1988 | Halsne | 165/286 |
| 4,836,095 A | | 6/1989 | Wright | |
| 4,995,307 A | | 2/1991 | Floyd | |
| 5,123,592 A | * | 6/1992 | Desmarais et al. | 236/49.3 |
| 5,205,783 A | | 4/1993 | Dieckert et al. | |
| 5,241,253 A | * | 8/1993 | Schlangen | 318/779 |
| 5,435,779 A | * | 7/1995 | Sharp et al. | 454/61 |
| 5,540,619 A | * | 7/1996 | Ahmed | 454/256 |
| 5,573,181 A | | 11/1996 | Ahmed | |
| 5,697,552 A | * | 12/1997 | McHugh et al. | 236/78 B |
| 5,862,982 A | | 1/1999 | Federspiel | |
| 5,863,246 A | * | 1/1999 | Bujak, Jr. | 454/255 |
| 5,951,394 A | * | 9/1999 | Pariseau | 454/61 |
| 5,971,067 A | * | 10/1999 | Rayburn et al. | 165/217 |
| 6,019,677 A | * | 2/2000 | Demster | 454/290 |

(Continued)

Primary Examiner — Kavita Padmanabhan
Assistant Examiner — Thomas Stevens
(74) Attorney, Agent, or Firm — Jay P. Hendrickson (57) ABSTRACT

A variable-air-volume system for modulating the speed of a supply fan by measuring a plurality of inlet static pressures within the inlet of a corresponding plurality of terminal boxes within the system; calculating a plurality of setpoint errors equal to the difference between the plurality of inlet static pressures and a corresponding plurality of terminal box setpoint pressures; selecting minimum setpoint error out of all of the calculated setpoint errors; and modulating the fan speed as a function of the minimum setpoint error. The system can also utilize a power adjustment factor to modify the terminal box set point pressures.

4 Claims, 9 Drawing Sheets

U.S. PATENT DOCUMENTS

| | | | |
|---|---|---|---|
| 6,227,961 B1 * | 5/2001 | Moore et al. | 454/229 |
| 6,719,625 B2 | 4/2004 | Federspiel | |
| 6,920,874 B1 * | 7/2005 | Siegel | 126/299 R |
| 6,941,193 B2 * | 9/2005 | Frecska et al. | 700/276 |
| 8,006,507 B2 * | 8/2011 | Bittner | 62/178 |
| 8,055,388 B2 * | 11/2011 | Mann et al. | 700/276 |
| 8,235,776 B2 * | 8/2012 | Stanimirovic | 454/256 |
| 2003/0064676 A1 * | 4/2003 | Federspiel | 454/75 |
| 2004/0065095 A1 * | 4/2004 | Osborne et al. | 62/160 |
| 2004/0067050 A1 * | 4/2004 | Woodward et al. | 388/804 |
| 2004/0093682 A1 * | 5/2004 | Litomisky et al. | 15/314 |
| 2006/0116067 A1 | 6/2006 | Federspiel | |
| 2006/0121844 A1 * | 6/2006 | Sparks | 454/337 |
| 2006/0161306 A1 | 7/2006 | Federspiel | |
| 2006/0234621 A1 * | 10/2006 | Desrochers et al. | 454/239 |
| 2007/0205297 A1 * | 9/2007 | Finkam et al. | 236/1 C |
| 2008/0139105 A1 * | 6/2008 | Kuentz | 454/238 |
| 2008/0161976 A1 * | 7/2008 | Stanimirovic | 700/276 |
| 2008/0264086 A1 * | 10/2008 | Liu | 62/180 |
| 2010/0082161 A1 * | 4/2010 | Patch | 700/276 |
| 2011/0014061 A1 * | 1/2011 | Hopkins et al. | 417/3 |

* cited by examiner

SYSTEM AND METHOD FOR CONTROLLING SUPPLY FAN SPEED WITHIN A VARIABLE AIR VOLUME SYSTEM

RELATED APPLICATION

This application relates to and claims the benefit under 35 U.S.C. §119(e) of U.S. Provisional Application No. 61/268,872 filed on Jun. 16, 2009.

TECHNICAL FIELD

This application relates to systems and methods for controlling supply fan speed within a variable-air-volume system ("VAV system") in response to the demand for heating, ventilating and air-conditioning within zones within a building.

BACKGROUND

Many buildings today utilize VAV systems to supply conditioned air to zones within the building. Normally, each will have numerous supply fans, with each fan associated with a duct system generally consisting of a main air supply duct that branches into several terminal supply ducts, with a terminal box at the terminus of each terminal supply duct. When the fans are being operated, conditioned air is continually moved through the duct system and into the zones within the building.

Conventional VAV systems are typically designed to maintain a static pressure setpoint at a single and fixed location within the duct system. The static pressure setpoint is maintained so as to provide sufficient air pressure to all of the terminal boxes based on calculated or simulated maximum design-load conditions, meaning the most thermally extreme conditions to be expected by the building. Typically, VAV system designers size terminal boxes such that the boxes are capable of supplying sufficient volumes of air to each of the zones within the building in order to satisfy maximum design-load conditions. The designers then establish the static pressure setpoint at a location that is approximately two-thirds of the distance from the supply fan to the end of the main air supply duct. A pressure sensor is provided at that location and static pressure setpoint is measured at that location, and an air supply fan is operated at a speed that is sufficient to maintain the static pressure set point at that location. Under partial-load conditions when building is experiencing less than maximum load conditions, it is becomes necessary to reduce the volumes of air being delivered to the zones within the building by partially closing the terminal box dampers. Unfortunately, by using this method the energy efficiency of the supply fan is greatly reduced due to the friction losses due to partially closed terminal box dampers and within the duct system. Since it common for VAV systems to operate under partial load conditions during the vast majority of hours of operation, such systems are normally operating at inefficient levels.

Several different control designs have been introduced in an attempt to overcome this limitation in conventional VAV systems. Recent approaches have been to design a system that dynamically resets the static pressure setpoint based upon changing demands for conditioned air. In particular, a VAV system has been proposed in U.S. Pat. No. 5,863,246 issued to Bujak in which a system controller is utilized to reset the design static pressure setpoint, at a location down-stream from the supply fan and within the main supply duct, based upon the position of all terminal dampers within the system as compared to certain predetermined damper positions. For example, if all terminal damper positions are determined to be open less than a predetermined minimum amount, then an offset calculation is performed which increases the value of a previously calculated offset by a predetermined incremental amount. On the other hand, if any damper position is determined to be open more than a predetermined maximum amount, then a different offset calculation is performed which decreases the value of the a previously calculated offset by a predetermined incremental amount, which may differ from the previously calculated incremental amount. The system controller then adjusts the design static pressure setpoint based upon the computed offset value, thereby generating a controlling static pressure setpoint. Next, the controller compares the controlling static pressure setpoint to a sensed static pressure within the main supply duct at the setpoint location. Lastly, the pressure in the main duct at the setpoint location is adjusted by modulating the supply fan speed based upon a comparison of the sensed static pressure to the controlling static pressure.

Although Bujak improves upon some of the energy inefficiencies of conventional VAV systems, the patent discloses several of its own limitations. One of the most significant limitations is that even though the VAV system disclosed in Bujak uses an algorithm to ostensibly identify the zone of greatest demand, the algorithm always measures a static pressure at a single and fixed location in the main supply duct down-stream from the supply fan. As a result, the system in Bujak attempts to modulate the supply of conditioned air to the zone of greatest demand by continuing to incorporate the limitation, as in other VAV systems, of using a single static pressure setpoint. This approach wastes energy since it will inevitably supply more static pressure than necessary to the terminal box serving the zone that the system identifies as having the greatest demand. Another important limitation of the system disclosed in Bujak is that it introduces an inherent friction loss and an associated loss of energy efficiency because the system prevents any terminal damper from operating in a wide-open condition. Bujak discloses another limitation arising from the fact that the system introduces a large "dead band" in which no changes to the static pressure setpoint can occur, making the design unresponsive to changes in demand for conditioned air within the zones within the building.

As will be discussed below, the VAV system of the present invention substantially improves upon the limitations in traditional VAV systems.

BRIEF SUMMARY OF THE INVENTION

A variable-air-volume heating, ventilating, and air conditioning system, comprises: a main air supply duct; a supply fan connected to the main air supply duct; a plurality of terminal air supply ducts integral with the main air supply duct; a plurality of terminal boxes connected to the corresponding plurality the terminal air supply ducts, with each of the terminal boxes having air inlet opening and a minimum static pressure rating; a static pressure sensor disposed within the air inlet opening of at least two of the terminal boxes, with said sensor for measuring an inlet static pressure associated with each of the terminal boxes; a supply fan controller in communication with each of the static pressure sensors, said controller for determining a setpoint error associated with each measured inlet static pressure associated with a terminal box, with the setpoint error equal to the difference between the measured inlet static pressure and the minimum static pressure rating of the associated terminal box, and with the controller selecting a minimum setpoint error and converting it to an analog signal; and a variable frequency drive in communication with the supply fan controller and the supply fan, said variable frequency drive for modulating the speed of the supply fan based upon the analog signal received from the supply fan controller.

The variable-air-volume system also comprises a power adjustment calculator in communication with the supply fan controller, with said calculator calculating a power adjustment factor that can be used to adjust the minimum static pressure rating of the terminal boxes.

A method of modulating supply fan speed in a variable-air-volume heating, ventilating, and air conditioning system, comprises to steps of: measuring a plurality of inlet static pressures within the inlet of a corresponding plurality of terminal boxes within the system; calculating a plurality of setpoint errors equal to the difference between the plurality of inlet static pressures and a corresponding plurality of terminal box setpoint pressures; selecting minimum setpoint error out of all of the calculated setpoint errors; and modulating the fan speed as a function of the minimum setpoint error.

The method of modulating supply fan speed in a variable-air-volume system also comprises the following steps: measuring a plurality of inlet static pressures within the inlet of a corresponding plurality of terminal boxes within the system; calculating a plurality of terminal box static pressure setpoints by applying a power adjustment factor to the setpoints; calculating a plurality of setpoint errors equal to the difference between the plurality of inlet static pressures and a corresponding the plurality of terminal box setpoint pressures; selecting minimum setpoint error out of all of the calculated setpoint errors; and modulating the fan speed as a function of the minimum setpoint error.

DETAILED DESCRIPTION OF PREFERRED EMBODIMENTS

Figure 1:
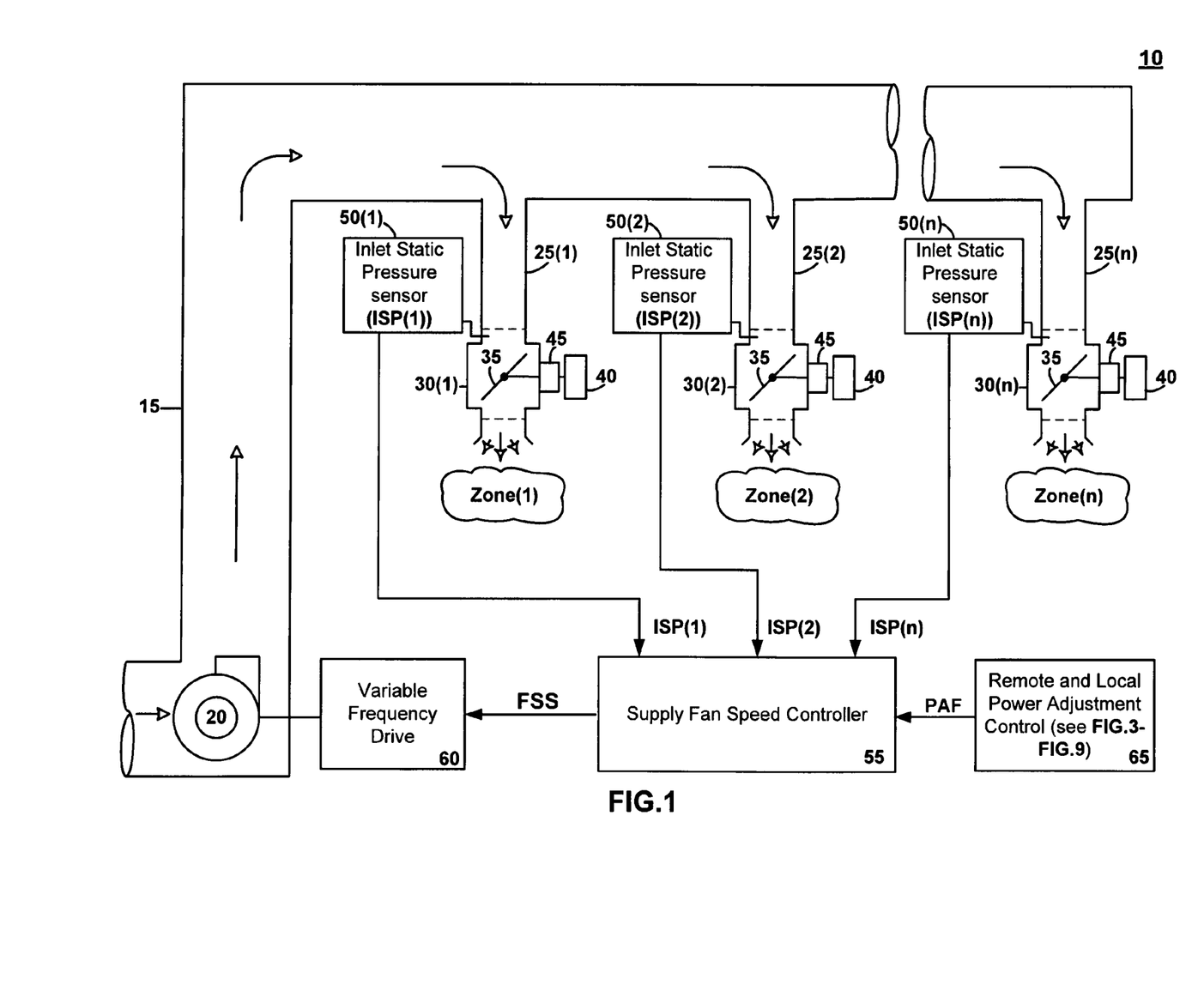
FIG. 1 is a schematic diagram of a variable-air-volume system for providing heating, ventilating, and air-conditioning to various zones within a building.
Figure 2:
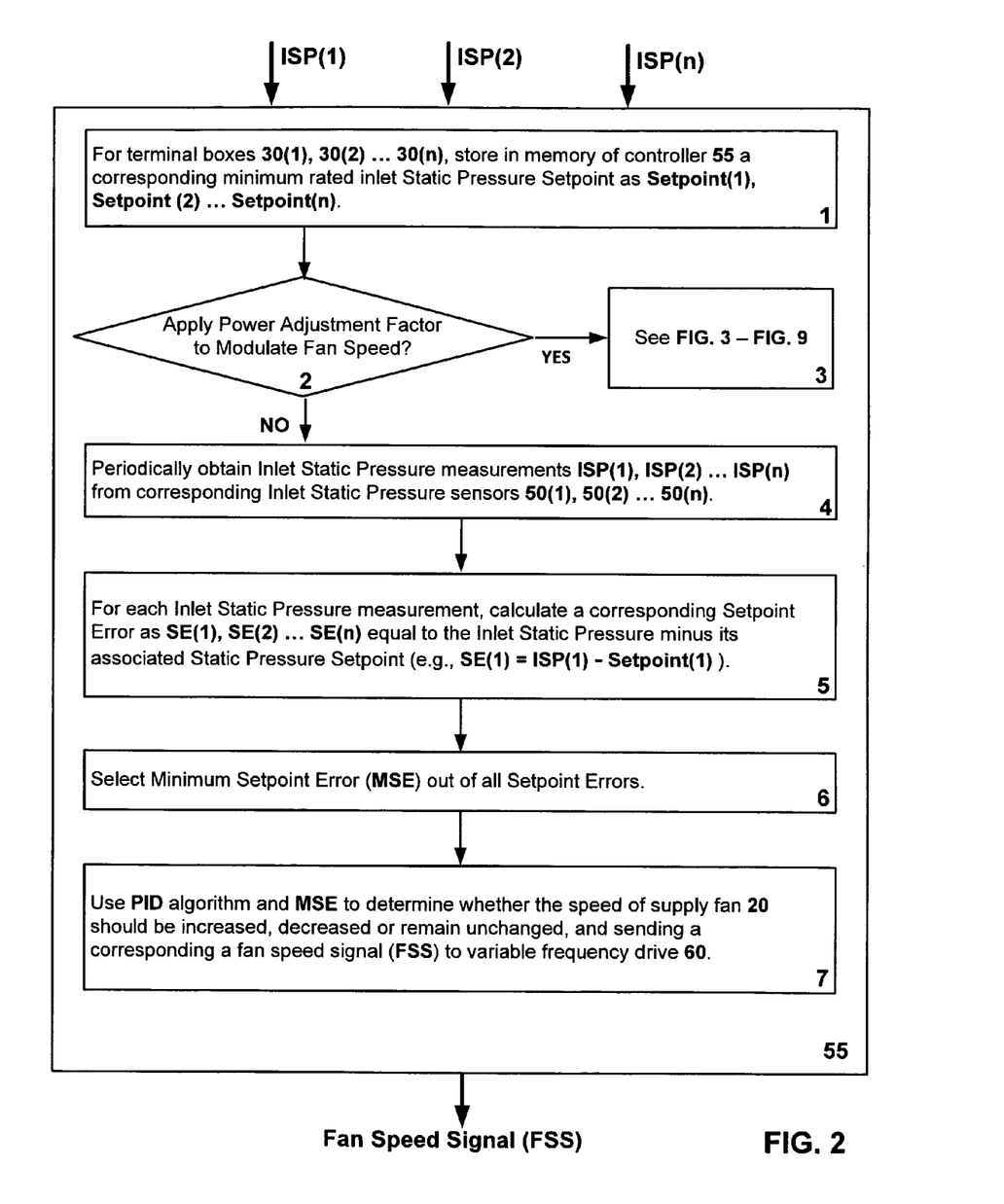
FIG. 2 is flow chart illustrating the functionality of a supply fan speed controller within a variable-air-volume system.

A preferred embodiment of a variable-air-volume system 10 is illustrated in FIG. 1 and FIG. 2. As shown in FIG. 1, system 10 includes a supply fan 20 that is utilized to supply conditioned air through a duct system and into a plurality of zones, illustrated as zone(1), zone(2) . . . zone (n), within a building. The duct system includes a main supply duct 15, a plurality of terminal supply ducts 25(1), 25(2) . . . 25(n), and a corresponding plurality of terminal boxes 30(1), 30(2) . . . 30(n). The outlet of supply fan 20 is connected to the inlet main supply duct 15. The plurality of terminal air supply ducts 25 are integral with the main supply duct 15, and the corresponding plurality of terminal boxes 30 are connected to the ends of terminal ducts 25. Each of terminal boxes 30 has an inlet and outlet opening, with an air control damper 35 disposed within each terminal box 30 and positioned between the inlet and outlet opening. The angular position of dampers 35 is controlled by a damper controller 40 and an actuator 45. The type of terminal boxes 30 utilized in system 10 can be any type of terminal box that is appropriate for the air pressures that are expected to be generated by system 10, including single and dual duct designs and fan powered designs, with each terminal box designed to operate between minimum and maximum rated inlet static pressures, in order to achieve a designed range of air flows. Examples of terminal boxes 30 that can be used with system 10 are: Model ESV single duct, variable-air-volume terminal, and Model EDV dual duct, variable-air-volume terminal, both manufactured by Titus; and Model SDR single duct, variable-air-volume terminal, and Model VFR parallel flow fan powered, variable-air-volume terminal, both manufactured by Envirotec.

System 10 also includes a plurality of inlet static pressure sensors 50(1), 50(2) . . . 50 (n) that are positioned within the inlet of the corresponding plurality of terminal boxes 30(1), 30(2) . . . 30(n). The inlet static pressure sensors 50 are utilized in system 10 to measure a static pressure at the inlet of each of the terminal boxes 30. As shown in FIG. 1, the inlet static pressure measurements are illustrated as ISP(1), ISP(2) . . . ISP(n), which correspond to inlet static pressure measurements made by sensors 50(1), 50(2) . . . 50(n), respectively. Examples of appropriate pressure sensors and related hardware for use with system 10 include: Model M264 Differential Pressure Transmitter, manufactured by Setra Corp.; Model T30/40 Series Differential Pressure Transmitter, manufactured by Modus; and a duct probe, model numbers A301 or 160 stainless pitot tube, manufactured by Dwyer Corp. for use with the transmitters. Each of the inlet static pressure sensors 50 has a electronic communication link to a supply fan speed controller 55. Although FIG. 1 illustrates a wired communication link, the link can also be wireless, such as a radio communication (For example: a low power mesh radio network, such as those using standards defined by IEEE 802.15.4). As will be described in more detail in connection with FIG. 2, supply fan speed controller 55 is a programmed general purpose computer (using an interface if necessary to convert the wired or wireless signals to a format such as USB 2.0) which uses the inlet static pressure measurements ISP, along with a corresponding minimum rated static pressure associated with a terminal box, to determine whether the speed of supply fan 20 should be increased, decreased or remain unchanged based upon the zone within the building having the greatest demand for conditioned air. If controller 55 determines that the speed of supply fan 20 should be changed, a variable frequency drive 60 in electronic communication with controller 55 utilizes a signal from the controller to change the fan speed, which in turn modifies the inlet static pressure associated with the terminal box servicing the zone having the greatest demand for conditioned air. In another embodiment, controller 55 can also receive a power adjustment factor PAF value that can be used by the system operator to further adjust the speed of supply fan 20 based upon, for example: fluctuating electricity prices received remotely over a network from a utility; or based upon local conditions or considerations that prompt the system operator to adjust the fan speed. Box 65 of FIG. 1 illustrates the PAF value being received by controller 55 and refers to FIGS. 2 through 9 which describe this embodiment in more detail.

The flow chart illustrated in FIG. 2 describes the operation of supply fan speed controller 55 within system 10. As part of a computer initialization process as illustrated in step 1, an operator inputs into the controller's persistent memory for each of the terminal boxes 30(1), 30(2) . . . 30(n) a corresponding terminal box static pressure setpoint as Setpoint(1), Setpoint(2), . . . Setpoint(n), with each static pressure setpoint equal to a minimum static pressure rating for a corresponding terminal box. In this manner, system 10 establishes a plurality of static pressure setpoints that can be used, as described in more detail below, to accurately identify the zone having the maximum demand for conditioned air, and to supply a volume of conditioned air to the zone of greatest demand that is not greater than necessary to meet the minimum static pressure rating for the terminal box servicing the zone. Continuing at step 2, the controller 55 determines whether a power adjustment factor PAF value, described in more detail below, is to be used to modulate the speed of supply fan 20. IF a PAF value is to be used, the processes described in FIGS. 3 through 9 are performed as illustrated in step 3. On the other hand, if the answer is no, control passes to step 4 where the controller periodically obtains at a predetermine time interval, for example every second, inlet static pressure measurements ISP(1), ISP(2) . . . ISP(n) from corresponding inlet static pressure sensors 50(1), 50(2) . . . 50(n). Control then passes to step 5, where the controller utilizes the inlet static pressure measurements ISP(1), ISP(2) ISP(n) in order to calculate corresponding setpoint errors SE(1), SE(2) . . . SE(n) equal to the ISP value minus its associated Setpoint value. For example, SE(1) would be equal to ISP(1) minus Setpoint(1). At step 6, the controller selects the minimum setpoint error MSE value out of all of the setpoint errors calculated at step 5, which has the effect of identifying the zone within the building having the greatest demand for conditioned air. The minimum setpoint error MSE value identifies the zone having the greatest demand for conditioned air due the fact that it is the zone being supplied with conditioned air coming from a terminal box where the difference between the measured static pressure at the inlet to terminal box and the static pressure setpoint, which is equal to the minimum rated static pressure for the terminal box, is less than all other terminal boxes. Finally, at step 7, the controller uses a proportional-integral-derivative (PID) algorithm and the minimum setpoint error MSE value in order to determine whether the speed of supply fan 20 should be increased, decreased or remain unchanged and sends a corresponding fan speed analog signal FSS to variable frequency drive 60, which modulates the speed of supply fan 20. In the algorithm, the MSE value is used as a process variable that used as an input, and the FSS signal is the manipulated variable. A PID setpoint can be zero so as to eliminate errors between the zone of greatest demand MSE value and the measured ISP at that zone. Appropriate PID devices for this purpose are well known to those skilled in the art. However, examples of devices that could be used are: LonPoint Modules AO-10 and AI-10, manufactured by Echelon Corp.; and a Pico GFX Controller, manufactured by Allen Bradley.

In operation, system 10 is able to accurately identify and supply conditioned air to the zone of greatest demand, while at the same time ensuring that the pressure of the air being supplied to that zone is maintained at a level that is not greater than necessary to meet the demand. This energy saving feature is accomplished by adjusting supply fan speed in response to the zone of greatest demand by maintaining the inlet static pressure of the terminal box supplying air to the zone of greatest demand equal to a static pressure setpoint that is defined as the minimum pressure rating of the terminal box. When the system identifies a different zone of greatest demand, the inlet static pressure to the terminal box supplying that zone will be maintained at a level equal to the static pressure setpoint of that terminal box by modulating the speed of supply fan 20. In this fashion, the system utilizes a variable static pressure setpoint that is a function of the location of the zone of greatest demand, rather than using a constant static pressure setpoint, usually located within the main supply duct approximately two-thirds of the distance from the fan, as in conventional systems. Conventional systems that use a single static pressure setpoint location waste energy because the system is usually supplying more pressure than necessary to satisfy the zone of greatest demand. In fact, such systems are not even capable of identifying the zone of greatest demand. In this regard, the present inventor is aware, however, of a system that attempts to identify the zone of greatest demand, but that system discloses several substantial limitations (See, Bujak and the discussion of its limitations in Background section above) that are overcome by or not included in system 10. One of the most significant limitations is that even though the VAV system disclosed in Bujak uses an algorithm to ostensibly identify the zone of greatest demand, the algorithm always uses the same static pressure setpoint that is located downstream from the supply fan in the main air supply duct. As a result, the system in Bujak attempts to modulate the supply of air zone of greatest demand by continuing to incorporate the limitation, as in other VAV systems, of using a single static pressure setpoint. This approach wastes energy since it will inevitably supply more conditioned air than necessary to zone that the system identifies as having the greatest demand. System 10, on the other hand, eliminates the use of a single static pressure setpoint and utilizes a plurality of static pressure setpoints in that each terminal box has an associated static pressure setpoint defined as the manufacturer's minimum rated static pressure. As a result, system 10 never supplies more conditioned air to the zone of greatest than necessary to meet the minimum static pressure requirements of the terminal box servicing the zone.

Another important limitation of the system disclosed in Bujak is that the system introduces an inherent friction loss and an associated loss of energy efficiency because the system prevents any terminal damper from operating in a wide-open condition. System 10, however, does not constrain the operation of the dampers, let alone prevent the dampers from operating in a wide-open condition. Finally, Bujak discloses a limitation arising from the introduction of a "dead band" in which no changes to the static pressure setpoint can occur, making the design unresponsive to changes in demand for conditioned air within the zones within the building. No such "dead bands" are encountered in system 10.

Although variable-air-system 10 described above and as illustrated in FIG. 1 and FIG. 2, describes a single supply fan and duct system providing conditioned air to various zones within the building, it will be understood by those skilled in the art that system 10 can include a plurality of systems with supply fans supplying conditioned air through corresponding duct systems.

In another embodiment of system 10, as illustrated in FIG. 2 through FIG. 9, the system includes a feature that, in addition to the energy efficiency feature of system 10 as described above, provides building operators with the option of managing power demand, either temporarily or on an on-going basis. As specifically illustrated in FIG. 3, this embodiment includes a power adjustment factor calculator 85 within system 10 that is connected to a network gateway device 80, which is, in turn, remotely connected to a utility 70, which can be for example, a public utility, a regional transmission organization, or an independent system operator, with the wireless connection being an internet service 75, which can be either a public or private network, or a radio broadcast. Within system 10, power adjustment factor calculator 85, which can be a general purpose computer, is also in communication with fan speed controller 55. In one aspect of this embodiment, utility 70 periodically publishes a demand response signal as the price ($/kWh) it is currently charging for electricity, with prices generally increasing during peak time periods when the demand for electricity is the greatest. As these prices become available to, for example, the operators of buildings which utilize VAV systems to supply conditioned air to zones within the building, the operators are given the opportunity to reduce their energy costs by slightly reducing the supply of conditioned air to the zone of maximum demand. In this aspect of system 10, the electricity prices are sent over the internet service 75 and, in turn, provided by the network gateway 80 to the power adjustment factor calculator 85 within system 10. Calculator 85 then converts the electricity prices to a power adjustment factor PAF value as specifically described in the flow diagram of FIG. 4.

Figure 4:
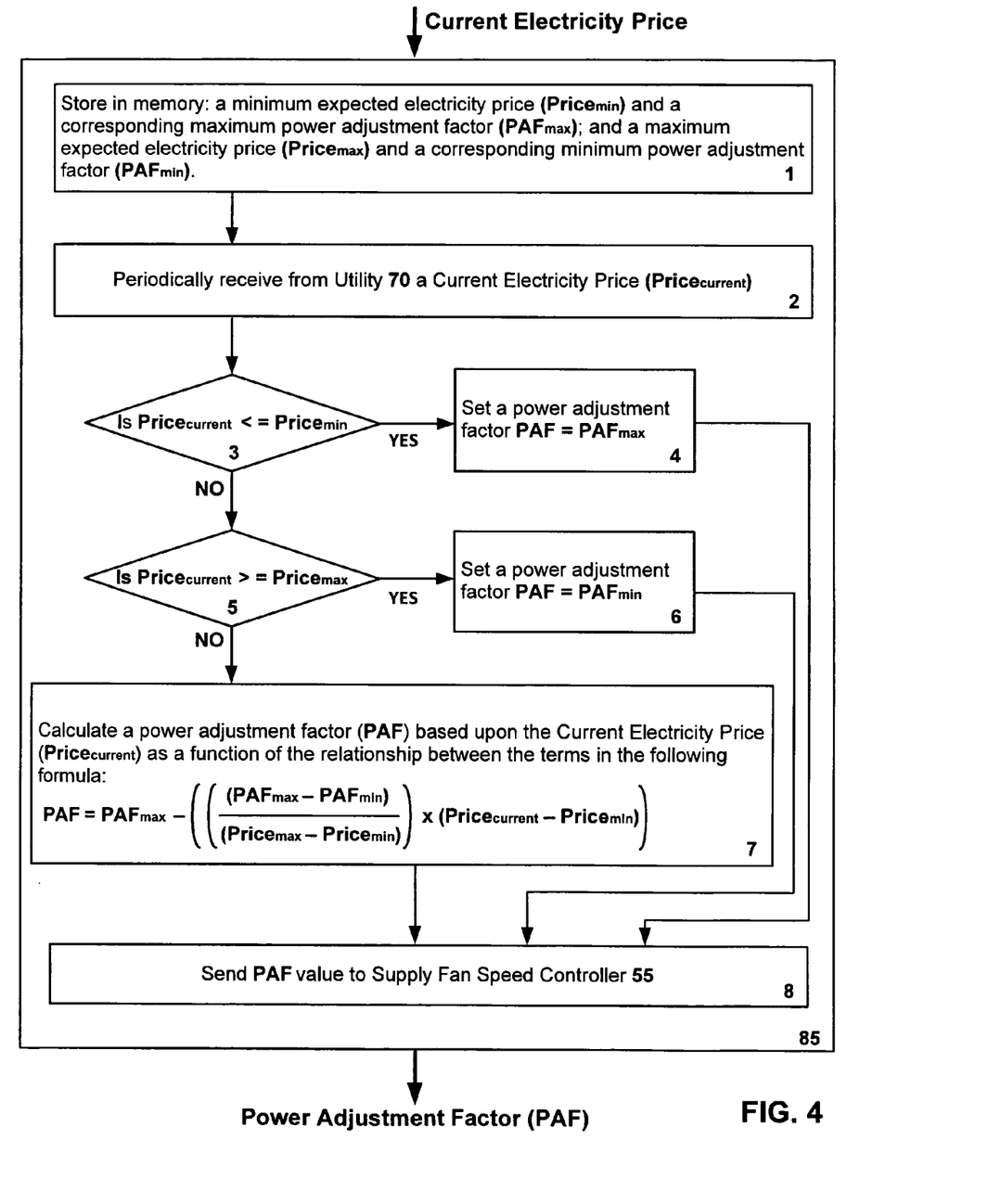
FIG. 4 is a flow chart illustrating the functionality of the power adjustment calculator.

As illustrated in step 1 of FIG. 4, as part of an initial setup process the operator stores the following information in the memory of the power adjustment factor calculator 85: 1) a minimum expected electricity price ($Price_{min}$) and a corresponding maximum power adjustment factor ($PAF_{max}$), and 2) a maximum expected electricity price ($Price_{max}$) and a corresponding minimum power adjustment factor ($PAF_{min}$). The $PAF_{max}$ is normally set to equal 1.0, which denotes that no change in the operational status of system 10 will be adjusted based upon the current electricity price from utility 70. The $PAF_{min}$, however, is set at a value that will have the greatest impact on system 10 in that its use may reduce the volume of conditioned air being supplied to the zone of greatest demand. The magnitude of $PAF_{min}$ will normally be determined experimentally by trying different values until a minimum value is found that accomplishes its dual objectives of reducing power consumption and only slightly reducing the volume of conditioned air being supplied to the zone of greatest demand. The $Price_{min}$ and $Price_{max}$ will normally correspond to the lowest and highest prices for electricity, respectively, being offered by utility 70.

Step 2 of FIG. 4 illustrates that power adjustment factor calculator 85 can periodically receive from utility 70 over internet service 75 and network gateway 80 a current electricity price ($Price_{current}$), which is the price for electricity currently being supplied by the utility. Once the current electricity price is received, calculator 85 converts the price to a power adjustment factor PAF value. The conversion process starts at step 3 where calculator 85 determines whether $Price_{current}$ is less than or equal to the $Price_{min}$, and if the condition is satisfied, the power adjustment factor PAF value is set to equal $PAF_{max}$ (normally equal to 1.0) at step 4, and control passes to step 8. If the condition at step 3 is not satisfied, then at step 5 calculator 85 determines if the $Price_{current}$ is greater than or equal to $Price_{max}$. If the condition is satisfied calculator 85 sets power adjustment factor PAF value equal to $PAF_{min}$ (normally determined experimentally), and control passes to step 8. On the other hand, if the condition at step 5 is not satisfied, control passes to step 7 where a power adjustment factor PAF value is calculated.

Figure 5:
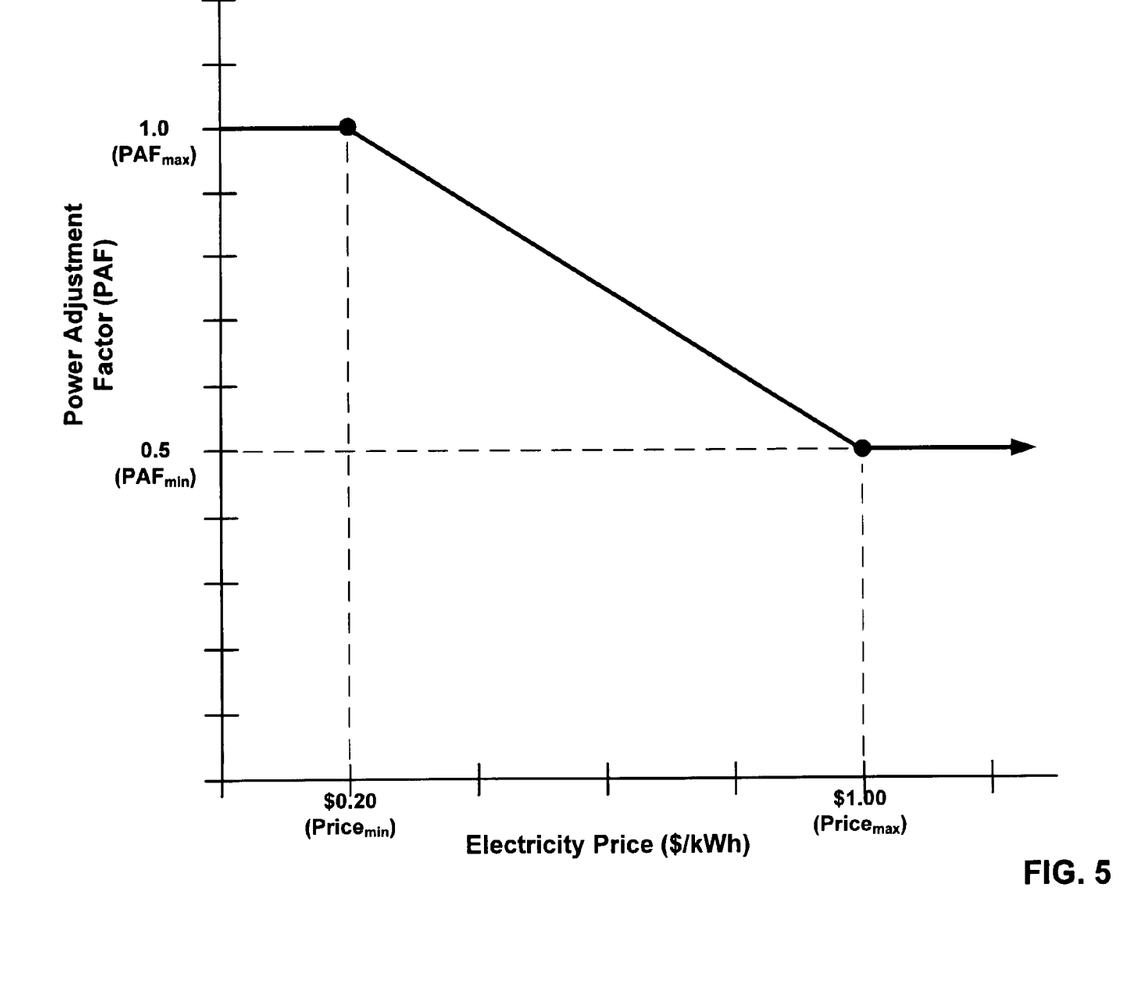
FIG. 5 is a graph illustrating a functional relationship between a price of electricity and a power adjustment factor.

The calculation of the PAF value is performed based upon a predetermined mathematical relationship between expected electricity prices and corresponding PAF values. In one implementation, an inverse linear relationship can be used, such as the relationship depicted on the graph illustrated in FIG. 5. The graph shows increasing electricity prices ($/kWh) on the x-axis and increasing power adjustment factors on the y-axis. The inverse linear relationship between electricity prices and PAF values depicted on the graph as a slanted line starting at x and y coordinate values of $0.20/kWh and 1.0 $PAF_{max}$, respectively, and terminating at the x and y coordinate values of $1.00/kWh and a 0.5 $PAF_{min}$, respectively. As can be seen from the graph, for electricity prices at or below $0.20/kWh, the PAF value is equal to 1.0, and for electricity prices at or above $1.00.KWh, the PAF value is equal to 0.5. Returning to step 7 of FIG. 4, calculator 85 calculates a power adjustment factor PAF value in accordance with the following formula:

$$PAF = PAF_{max} - [((PAF_{max} - PAF_{min})/(Price_{max} - Price_{min})) \times (Price_{current} - Price_{min})]$$

Substituting the PAF and Price values as depicted on the graph and assuming that the current electricity price determined in step 2 is equal to 0.80 $/kWh, the PAF value is determined to be:

$$PAF = 1.0 - (1.0 - 0.5)/(1.00 - 0.20)) \times (0.80 - 0.20)$$

$$PAF = 0.625$$

Finally, at step 8, if the system operator has enabled the supply fan speed controller 55 to receive the PAF value from power adjustment factor calculator 85, the calculator sends the PAF value as a digital signal determined at step 7 to each controller 55 within system 10 within the building. On the other hand, if the current price for electricity is determined to be equal to 0.20 $/kWh, then at step 3 the current price would be equal to the minimum price depicted on the graph, and at step 4 the PAF value would be set to equal 1.0 and that value would be passed to step 8 where the value would be sent to controller 55. Similarly, if the current price of electricity is determined to be $1.00 $/kWh, then at step 5 the current price would be equal to maximum price depicted on the graph, and at step 6 the PAF value would be set to 0.5 and that value passed to step 8 where the value would be sent to controller 55. Once a PAF value has been sent to all supply fan speed controllers 55, its use by system 10 is illustrated in FIGS. 6 through 9, with each figure illustrating a different use of the PAF value.

In another aspect of the utilization of a demand response signal from utility 70, the utility on occasion will publish price multipliers that it uses to change the current price of electricity by multiplying the price times the multiplier. Normally the price multipliers will remain in use for fixed periods of time, determined by the utility. The price multipliers can be used by calculator 85 in place of the electricity prices, as illustrated in FIG. 5. In another aspect, the utility may publish a demand response contingency signal that represents power generation or transmission emergencies in which power grid compromised. In that event, calculator 85 can be programmed to select the $PAF_{min}$ value described in connection with FIG. 5, which causes the supply fan 20 to operate at a lower power level. In all non-contingency periods $PAF_{max}$ value is used.

Although the relationship between electricity prices and PAF values has been described as being linear, as illustrated in FIG. 5, in another aspect of the use of PAF values the power adjustment calculator 85 can be programmed with a non-linear functional relationship (based upon well known fan affinity laws) between prices and PAF values in order to generate PAF values that will cause controller 55 to generate a fan speed signal FSS that varies linearly with price.

Figure 3:
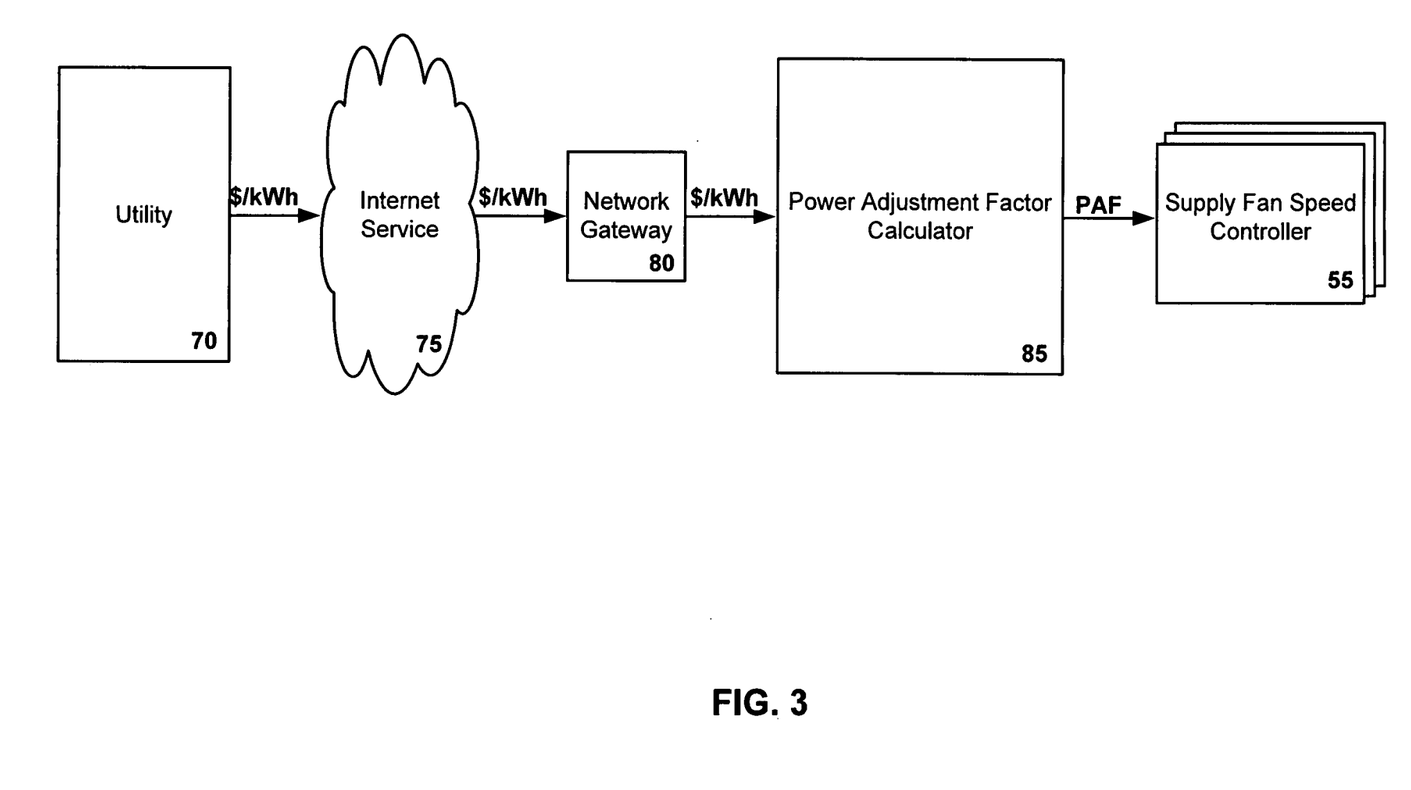
FIG. 3 is schematic diagram of a variable-air-volume system which includes the use of a demand response signal and its use by a power adjustment factor calculator within the system.
Figure 6:
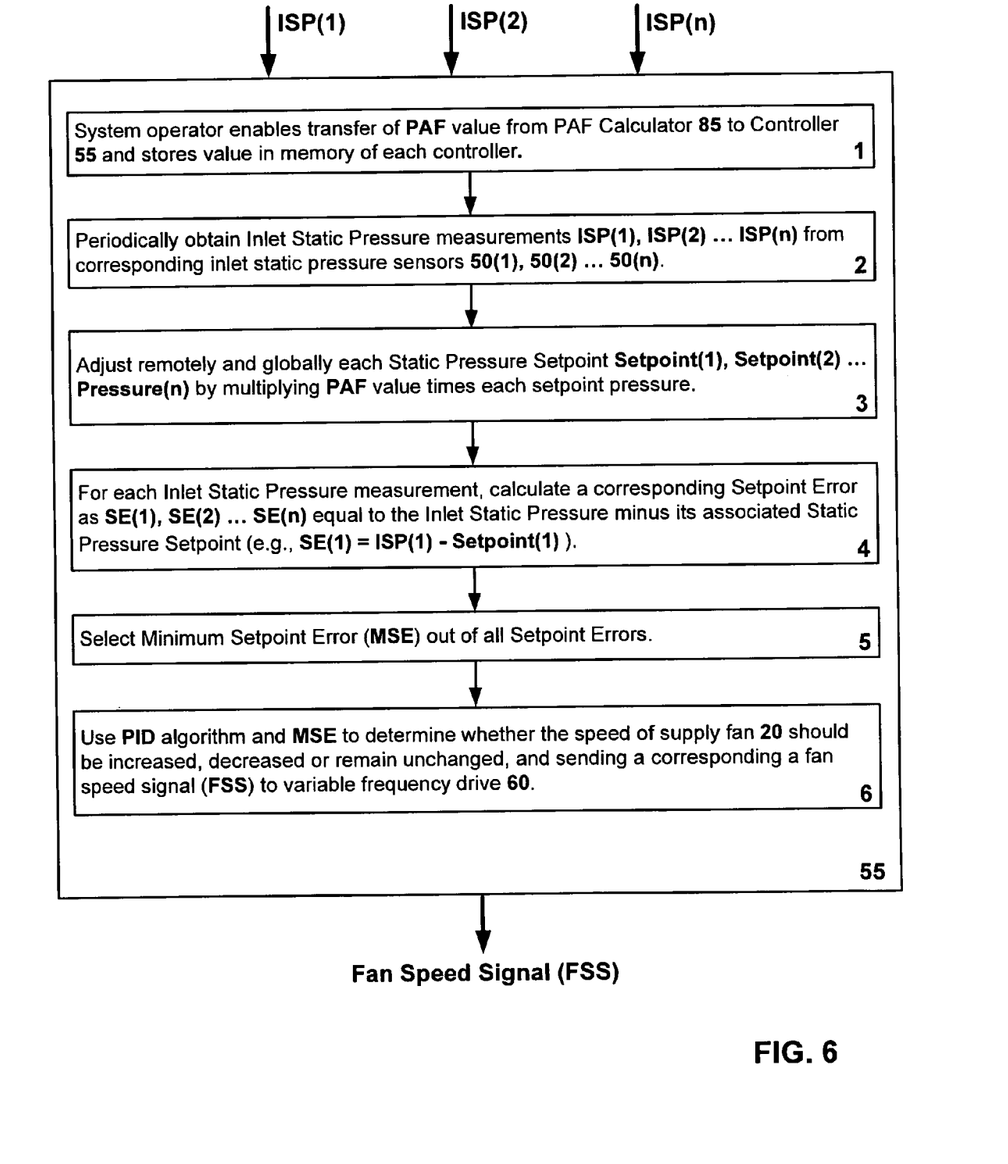
FIG. 6 is flow chart illustrating the functionality of the supply fan speed controller, including the remote application of a power adjustment factor used globally to modulate supply fan speed.

FIG. 6 illustrates the use of a PAF value that is based upon a demand response signal as the price of electricity being charged by utility 70, with the price of electricity, as illustrated in FIG. 3, sent remotely by the utility over a network to system 10, where the PAF value is used globally to modify all of the static pressure setpoints within system 10. As mentioned above in connection with FIG. 2, the system operator has the option to enable system 10 to modulate fan speed by using a PAF value, and if a PAF value is to be used the process is as described in FIGS. 3 through 9. Accordingly, the description of FIG. 6 assumes that the operator has enabled the system to use a PAF value. At step 1 of FIG. 6, the system operator can obtain the PAF value from the power adjustment factor calculator 85 and then store it in the memory of supply fan speed controller 55, or the PAF value can be automatically transferred to the memory of the controller. At step 2, controller 55 periodically obtains at predetermined time intervals, for example every second, inlet static pressure measurements ISP(1), ISP(2) . . . ISP(n) from corresponding inlet static pressure sensors 50(1), 50(2) . . . 50(*n*). Then at step 3 controller 55 uses the PAF value, derived from the remotely received price of electricity, to globally adjust all of the static pressure setpoints Setpoint(1) Setpoint(2) . . . Setpoint(n) by multiplying the PAF value times each static pressure setpoint. Control then passes to step 4, where the controller utilizes the inlet static pressure measurements ISP(1), ISP(2) . . . ISP(n) in order to calculate corresponding setpoint errors SE(1), SE(2) . . . SE(n) equal to the ISP value minus its associated Setpoint value. For example, SE(1) would be equal to ISP(1) minus Setpoint(1). At step 5, the controller selects the minimum setpoint error MSE value out of all of the setpoint errors calculated at step 5, which has the effect of identifying the zone within the building having the greatest demand for conditioned air. As previously explained in connection with FIG. 2, the minimum setpoint error MSE value identifies the zone having the greatest demand for conditioned air due the fact that it is the zone being supplied with conditioned air coming from a terminal box where the difference between the measured static pressure at the inlet to terminal box and the static pressure setpoint, equal to the minimum rated static pressure for the box, is less than all other terminal boxes. However, in this instance the MSE value will be modified due to the use of the PAF value to modify the static pressure setpoints. If the PAF value is less than 1.0 and above zero, its use will cause the MSE value to increase over other MSE values that would have been identified if a PAF value had not been used, thereby reducing the speed of supply fan 20. Finally, at step 6, the controller uses a proportional-integral-derivative (PID) algorithm and the minimum setpoint error MSE value in order to determine whether the speed of supply fan 20 should be increased, decreased or remain unchanged and sends a corresponding fan speed analog signal FSS to variable frequency drive 60. Frequency drive 60 then modulates the speed of supply fan 20, ultimately in response to the remotely received demand response signal as the price of electricity from utility 70.

Figure 7:
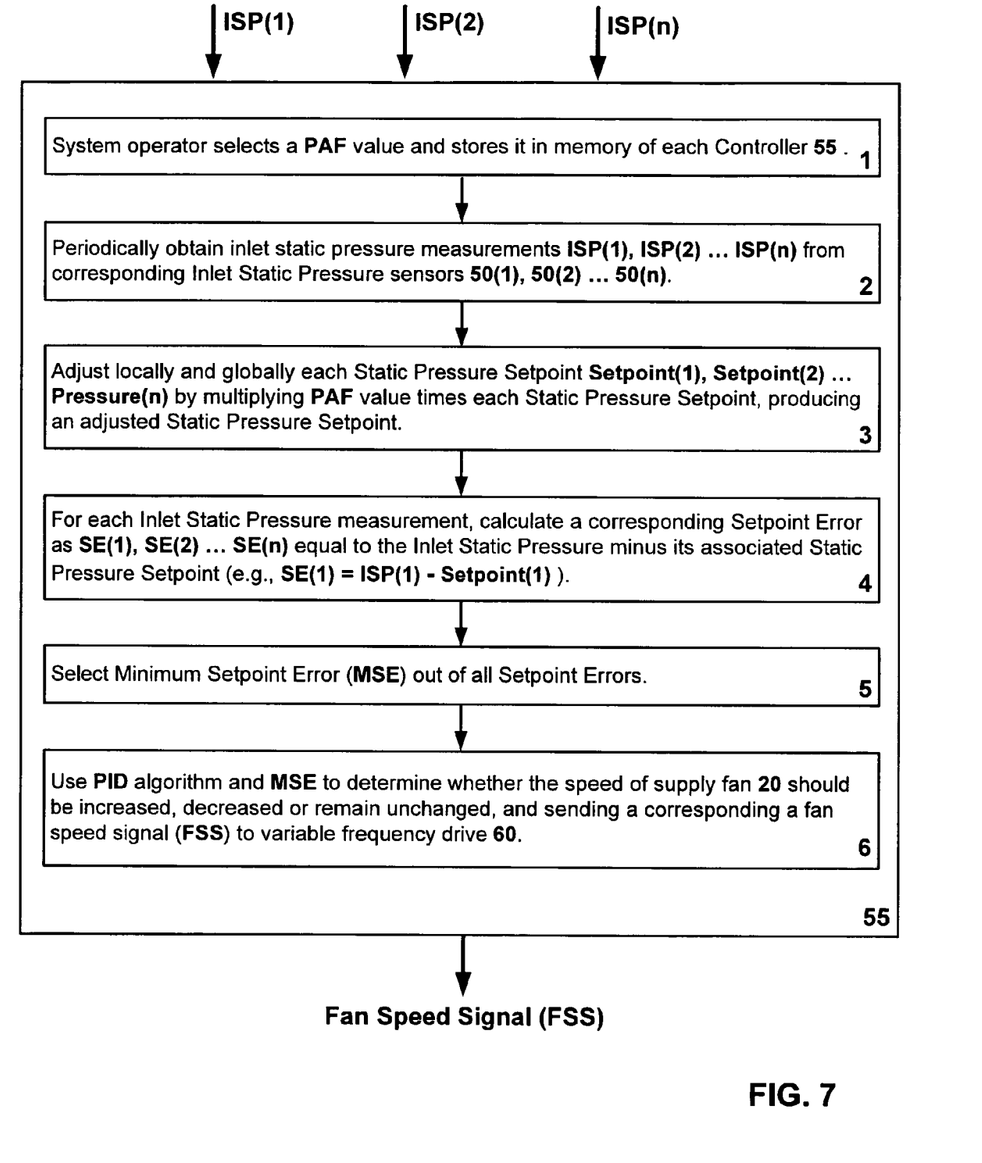
FIG. 7 is flow chart illustrating the functionality of the supply fan speed controller, including the local application of a power adjustment factor used globally to modulate supply fan speed.

In addition to modulating power in response to a demand response signal remotely received from utility 70, with the signal based upon external conditions like the price of electricity under control of the utility, the system operator can also modulate power based upon conditions that exist locally within system 10. For example, the system operator can globally reduce the power consumption of system 10 based upon a socially or financially motivated desire to cause the building to operate in a more "green" fashion. This aspect of system 10 is shown in FIG. 7. In this regard the steps in the figure are identical to the steps in FIG. 6, with the only difference being that at step 1 the system operator selects and stores the PAF value in the memory of supply fan speed controller 55, rather than receiving the value from power adjustment factor calculator 85, which calculated the value based upon the price of electricity. The PAF value selected by the operator depends upon by how much the operator desires to reduce power consumption. The selection of a PAF value can be largely based upon a trial-and-error process in which the operator gradually decreases the PAF value below 1.0 until a level is reached at which one or more zones within the building experience unacceptable levels of conditioned air.

In another aspect, the system operator can modulate power locally by adjusting the supply of conditioned air to specific zones within the building. This feature of system 10 is illustrated in FIG. 8, which again assumes that the system operator has enabled the use of a PAF value as mentioned in connection with FIG. 2. At step 1 the system operator selects and stores in the memory of each supply fan speed controller 55 at least one static pressure setpoint out of Setpoint(1) Setpoint (2) . . . Setpoint(n), corresponding to terminal boxes 30(1), 30(2) . . . 30(*n*), and at step 2 the operator selects and stores in the memory of the controller a PAF value to be associated with each of the selected static pressure setpoints. In this regard, the PAF value associated with a selected static pressure setpoint can be the same in all instances or the values can vary between setpoints. At step 3, the controller 55 periodically obtains at a predeterminte time interval, for example every second, inlet static pressure measurements ISP(1), ISP (2) . . . ISP(n) from corresponding inlet static pressure sensors 50(1), 50(2) . . . 50(*n*). Then at step 4, controller 55 individually adjusts each static pressure setpoint selected at step 2 by multiply each selected static pressure setpoint times its corresponding PAF value selected at step 2. Next at step 5, for each inlet static pressure measurement obtained at step 4, The controller calculates a corresponding setpoint error SE(1), SE(2) . . . SE(n) equal to the ISP minus its associated static pressure setpoint, including the static pressure setpoints adjusted at step 4 and those not adjusted. For example, SE(1) would be equal to ISP(1) minus Setpoint(1). At step 6, the controller selects the minimum setpoint error MSE value out of all of the setpoint errors calculated at step 5, which again has the effect of identifying the zone within the building having the greatest demand for conditioned air. In this instance, however, the MSE value may be modified due to the use of the selected PAF value or values to modify the selected static pressure setpoint or setpoints, respectively. If the PAF value is less than 1.0 and above zero, its use may cause the MSE value to increase over other values that would be otherwise be selected without using a PAF value, thereby potentially reducing the speed of supply fan 20. Finally, at step 7, the controller uses a proportional-integral-derivative (PID) algorithm and the minimum setpoint error MSE value in order to determine whether the speed of supply fan 20 should be increased, decreased or remain unchanged and sends a corresponding fan speed analog signal FSS to variable frequency drive 60, which modulates the speed of supply fan 20.

Figure 8:
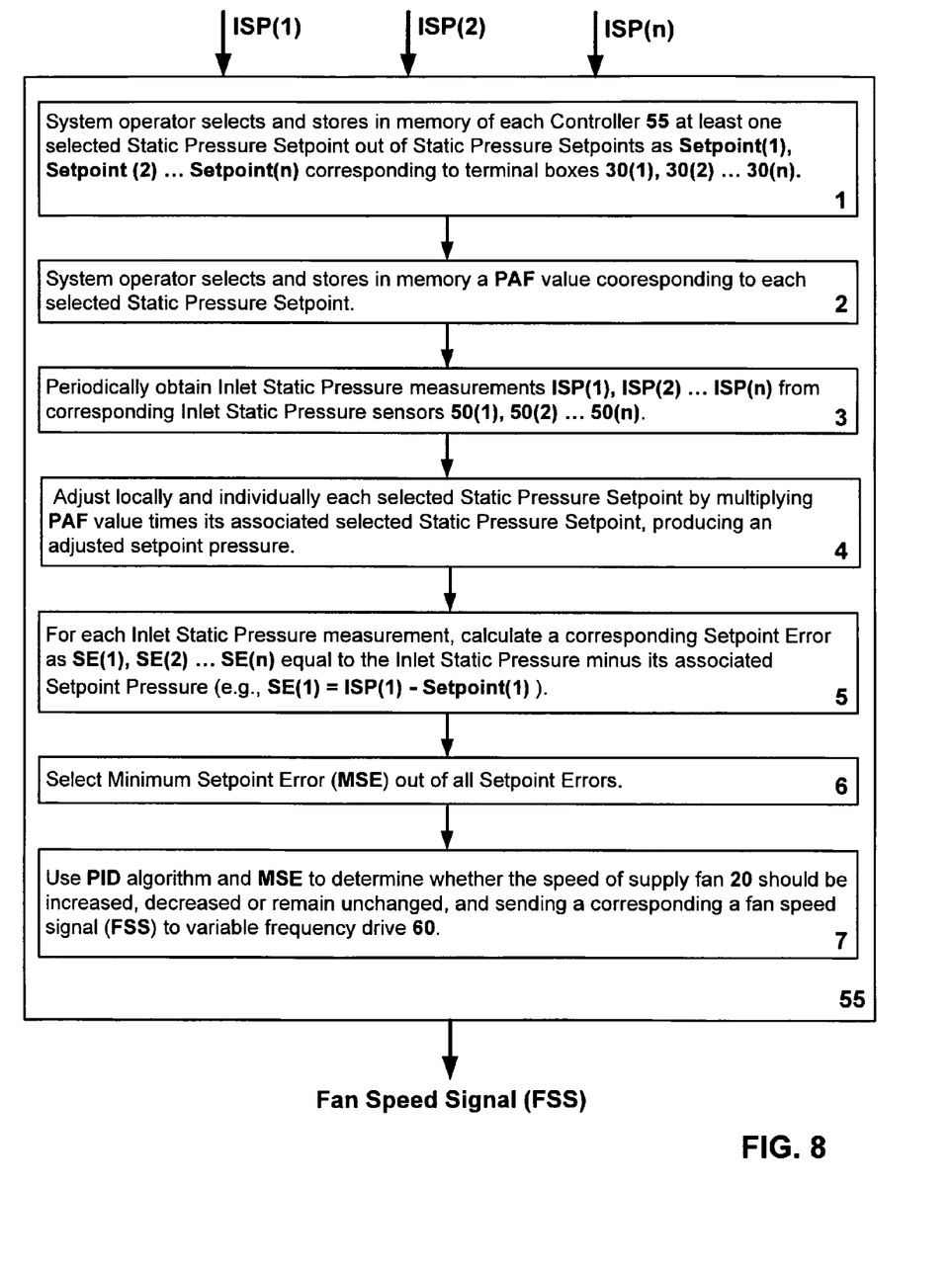
FIG. 8 is flow chart illustrating the functionality of the supply fan speed controller, including the local application of a power adjustment factor used individually to modulate supply fan speed.
Figure 9:
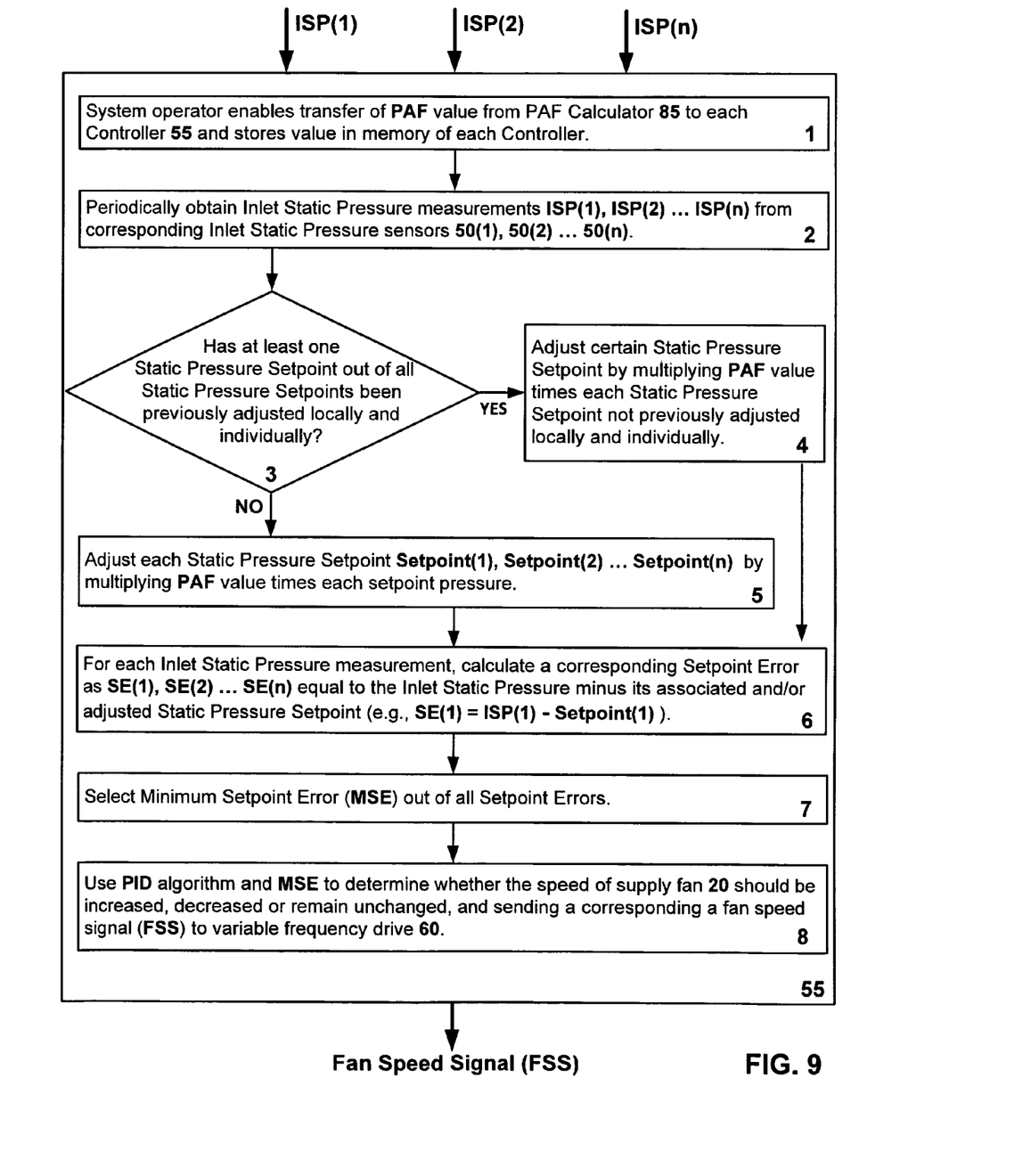
FIG. 9 is flow chart illustrating the functionality of the supply fan speed controller, including the remote and local application of a power adjustment factor used globally and individually to modulate supply fan speed.

Lastly, FIG. 9 illustrates that the operator may modulate power consumption globally based upon a demand response signal from a utility, while at the same time preventing certain zones within the building from being adjusted by the demand response signal. More specially, this aspect of system 10 involves the situation, described in FIG. 8, in which the system operator has previously adjusted the volume of conditioned air being supplied to one or more zones within the building by using a PAF value to adjust static pressure setpoints corresponding to terminal boxes supplying the conditioned air to the zones. At step 1 of FIG. 9, the system operator enables the transfer of a PAF value from power adjustment factor calculator 85 to each supply fan speed controller 55. Then at step 2, the controller periodically obtains at a predetermined time interval, for example every second, inlet static pressure measurements ISP(1), ISP(2) . . . ISP(n) from corresponding inlet static pressure sensors 50(1), 50(2) . . . 50(n). Then control passes to step 3 where the controller determines whether at least one static pressure setpoint has been previously adjusted by the operator, locally and individually, as illustrated in FIG. 8. If previous static pressure setpoints have been adjusted, control passes to step 4 where each of the static pressure setpoints Setpoint(1) Setpoint(2) . . . Setpoint(n) is adjusted by multiplying the PAF value times each static pressure setpoint that was not previously adjusted locally and individually. Control then passes to step 5. But, if at step 3 if it is determined that no previous adjustments to static pressure setpoints have been made, control passes to step 4 where the controller adjusts all of the static pressure setpoints Setpoint(1) Setpoint(2) . . . Setpoint(n) by multiplying the PAF value times each static pressure setpoint, and passes control to step 5. Next at step 5, for each inlet static pressure measurement obtained at step 2, calculate a corresponding setpoint error SE(1), SE(2) . . . SE(n) equal to the ISP minus its associated static pressure setpoint, including the setpoints that may have been adjusted at step 4. For example, SE(1) would be equal to ISP(1) minus Setpoint(1). At step 6, the controller selects the minimum setpoint error MSE value out of all of the setpoint errors calculated at step 6, which again has the effect of identifying the zone within the building having the greatest demand for conditioned air. In this instance, however, the MSE value may be modified due to the use of the selected PAF value or values to modify the selected static pressure setpoint or setpoints, respectively. If the PAF value is less than 1.0 and above zero, its use may cause the MSE value to increase over other values that would be identified without using a PAF value, thereby potentially reducing the speed of supply fan 20. Finally, at step 6, the controller uses a proportional-integral-derivative (PID) algorithm and the minimum setpoint error MSE value in order to determine whether the speed of supply fan 20 should be increased, decreased or remain unchanged and sends a corresponding fan speed analog signal FSS to variable frequency drive 60, which modulates the speed of supply fan 20.

Although system 10 has been described in its preferred embodiment and in certain other embodiments, it will be recognized by those skilled in the art that other embodiments and features may be provided without departing from the underlying principals of those embodiments. The scope of the invention is defined by the appended claims.

The invention claimed is:

1. A variable-air-volume heating, ventilating, and air conditioning system, comprising:
   a duct system;
   a supply fan integral with the duct system;
   a plurality of terminal boxes integral with the duct system, with the plurality of terminal boxes having a corresponding plurality of air inlet openings, and with the plurality of terminal boxes for supplying air to a corresponding plurality of zones within a building;
   a plurality of static pressure sensors, with each static pressure sensor located within a different air inlet opening out of the plurality of air inlet openings, and with each static pressure sensor for measuring an inlet static pressure associated with a terminal box;
   a plurality of static pressure setpoints, with each static pressure setpoint associated with a different air inlet opening out of the plurality of air inlet openings, and with each static pressure setpoint equal to a minimum static pressure rating of a different terminal box out of the plurality of terminal boxes;
   a programmed supply fan controller in communication with each of the static pressure sensors, said programmed supply fan controller for determining a setpoint error associated with each measured inlet static pressure associated with a terminal box, with the setpoint error equal to the difference between the measured inlet static pressure and the static pressure setpoint associated with the air inlet opening of the terminal box, and with said programmed supply fan controller selecting a minimum setpoint error out of all of the setpoint errors and converting it to an analog signal for use in modulating speed of the supply fan; whereby the modulated fan speed supplies a volume of air to a zone within the building that has a demand for air that is greater than any other zone in the building, with the volume of air not being greater than necessary to satisfy the minimum static pressure rating for the terminal box servicing said zone of greatest demand.

2. The variable-air-volume system of claim 1 further comprising:
   a power adjustment calculator in communication with the programmed supply fan controller, with said power adjustment calculator for calculating a power adjustment factor that can be used to adjust the minimum static pressure rating of at least one terminal box out of the plurality of terminal boxes by adjusting a static pressure setpoint associated with the air inlet opening of said at least one terminal box.

3. A method of modulating supply fan speed in a variable-air-volume heating, ventilating, and air conditioning system, comprising:
   providing a duct system;
   providing a supply fan integral with the duct system;
   providing a plurality of terminal boxes integral with the duct system, with the plurality of terminal boxes having a corresponding plurality of air inlet openings, and with the plurality of terminal boxes supplying air to a corresponding plurality of zones within a building;
   providing a plurality of static pressure sensors;
   locating each static pressure sensor out of the plurality of static pressure sensors within a different air inlet opening out of the plurality of air inlet openings;
   using the plurality of static pressure sensors to measure a corresponding plurality of inlet static pressures;
   providing a plurality of static pressure setpoints;
   associating each static pressure setpoint out of the plurality of static pressure setpoints with a different air inlet opening out of the plurality of air inlet openings, and setting each static pressure setpoint equal to a minimum static pressure rating of a different terminal box out of the plurality of terminal boxes;
   utilizing a programmed supply fan controller in communication with each of the static pressure sensors to determine a setpoint error associated with each measured inlet static pressure associated with a terminal box by: calculating the difference between the measured inlet static pressure and the static pressure setpoint associated with the air inlet opening of the terminal box; selecting a minimum setpoint error out of all of the setpoint errors;

and converting the minimum setpoint error to an analog signal for use in modulating speed of the supply fan; and whereby the modulated fan speed supplies a volume of air to a zone within the building that has a demand for air that is greater than any other zone in the building, with the volume of air not being greater than necessary to satisfy the minimum static pressure rating for the terminal box servicing said zone of greatest demand.

4. The method as in claim 3 of modulating supply fan speed in a variable-air-volume heating, ventilating, and air conditioning system, further comprising:

using a power adjustment calculator in communication with the programmed supply fan controller for calculating a power adjustment factor that can be used to adjust the minimum static pressure rating of at least one terminal box out of the plurality of terminal boxes by adjusting a static pressure setpoint associated with the air inlet opening of said at least one terminal box.

\* \* \* \* \*